(12) United States Patent
Worth (10) Patent No.: US 10,656,040 B2
(45) Date of Patent: May 19, 2020

(54) HARSH ENVIRONMENT DIFFERENTIAL PRESSURE MONITOR

(71) Applicant: Brian Worth, Woody Point (AU)

(72) Inventor: Brian Worth, Woody Point (AU)

(73) Assignee: Acrulog Pty. Ltd., Clontarf Qld (AU)

( * ) Notice: Subject to any disclaimer, the term of this patent is extended or adjusted under 35 U.S.C. 154(b) by 195 days.

(21) Appl. No.: 16/002,875

(22) Filed: Jun. 7, 2018

(65) Prior Publication Data

US 2018/0356310 A1 Dec. 13, 2018

(30) Foreign Application Priority Data

Jun. 9, 2017 (AU) .................................. 2017902207

(51) Int. Cl.
| | |
|---|---|
| *G01L 19/00* | (2006.01) |
| *G01L 19/06* | (2006.01) |
| *G01L 19/08* | (2006.01) |
| *G01L 13/00* | (2006.01) |

(52) U.S. Cl.
CPC .......... *G01L 19/0627* (2013.01); *G01L 13/00* (2013.01); *G01L 19/0092* (2013.01); *G01L 19/0636* (2013.01); *G01L 19/086* (2013.01)

(58) Field of Classification Search
CPC combination set(s) only.
See application file for complete search history.

(56) References Cited

U.S. PATENT DOCUMENTS

| | | | |
|---|---|---|---|
| 6,198,400 B1 * | 3/2001 | Church .............. | G01N 33/0006 340/632 |
| 10,184,910 B2 * | 1/2019 | Lammel ............... | G01N 27/041 |
| 2017/0122783 A1 * | 5/2017 | Xue ........................ | G01D 21/02 |
| 2017/0234845 A1 * | 8/2017 | Worth ................ | G01N 33/0006 73/23.21 |
| 2019/0011416 A1 * | 1/2019 | Worth .................... | G01N 11/04 |

* cited by examiner

*Primary Examiner* — Andre J Allen
(74) *Attorney, Agent, or Firm* — Michael W. Goltry; Robert A. Parsons; Parsons & Goltry, PLLC

(57) ABSTRACT

A differential pressure monitoring apparatus includes a case having a continuous sidewall including a first end closed a by first end cap, and a second end closed by a second end cap. A differential pressure monitoring unit mounted in the case includes a differential pressure sensor in communication with the external environment, a temperature and humidity sensor in communication with an internal atmosphere inside the case, a data processor operatively connected to the sensors, data storage, an information display viewable through the case, a non-gas permeable membrane tube in connection with the differential pressure sensor and an internal environment and a harsh and/or corrosive gas filter in connection to the differential pressure sensor.

13 Claims, 10 Drawing Sheets

US 10,656,040 B2

HARSH ENVIRONMENT DIFFERENTIAL PRESSURE MONITOR

CROSS-REFERENCE TO RELATED APPLICATION

This application claims the benefit of Australian Provisional Patent Application No. 2017902207, filed Jun. 9, 2017, the entire contents of which are incorporated herein by reference.

FIELD OF THE INVENTION

The present invention relates to an apparatus and methods for monitoring differential pressure in chosen environments, such as wastewater infrastructures and other hostile environments.

BACKGROUND OF THE INVENTION

Differential pressure monitors are used in a variety of industries for measuring the differential pressure of the chosen environments. Differential pressure monitors have been limited in their capacity to function in environments where there exists, high humidity, and/or a hostile environment, such as; waste water infrastructures, refineries, fumigation facilities, paper pulp mills, ship building facilities, and other hostile environments. Differential pressure monitors have been limited in their capabilities and effectiveness in these industries as a result of humidity uptake and/or poor conditions, and/or levels of harsh and/or corrosive substances. As a result of these limitations the need for an improved differential pressure monitor capable of continuous operation in such conditions and environments becomes apparent.

SUMMARY OF THE INVENTION

A differential pressure monitoring apparatus includes a differential pressure monitoring unit mounted in a case. The case includes a continuous sidewall having opposed first and second ends. The first end is closed by a first end cap. The second end is closed by a second end cap. The first end cap is integral with, being inseparable from, the first end of the continuous sidewall. The second end cap is connected sealably and removably to the continuous sidewall. The continuous sidewall is triangular, having three sides and three corners, between the first end and the second end, two of the three sides being straight and equal in length, one of the three sides being rounded, and each of the three corners being rounded. The differential pressure monitoring apparatus includes; differential pressure sensors in sealed fluid communication with an ambient atmosphere outside the case, a temperature and humidity sensor in sealed fluid communication with the atmosphere inside the case, a data processor operatively connected to the differential pressure sensor, and the temperature and humidity sensor, data storage and an information display operatively connected to the data processor; an externally operable switch for selectively connecting the data processor to the data storage to allow transfer of data from the data storage to the data processor, and a communication device operatively connected to at least one of the data processor and the data storage for enabling data transfer between an external destination and at least one of the data processor and the data storage. A power supply mounted in the case is operatively connected to power the differential pressure monitoring unit. The temperature and humidity sensor is mounted to the second end cap and is in sealed fluid communication with the inner volume. The information display confronts the rounded one of the three sides of the continuous sidewall. The rounded one of the three sides of the continuous sidewall is transparent to enable the viewing of the information display therethrough. There is a catch formed in the first end of the case from which the apparatus can be suspended. There is a non-gas permeable membrane tube in connection with the differential pressure sensor and external environment to filter out moisture, and a filter system to reduce harsh and/or corrosive gas coming in fluid connection to the differential pressure sensor. An internal humidity and temperature sensor monitors the inner volume temperature and humidity level. The communication device is a wireless communication device for enabling wireless data transfer between the external destination and at least one of the data processor and the data storage. The differential pressure monitoring unit further includes an inertial sensor sealed from the ambient atmosphere, and the data processor is operatively connected to the inertial sensor. The data process is for calculating differential pressure and at least one of, and preferably both, moisture uptake level and moisture uptake rate of the unit, when the temperature and humidity sensor is sensing moisture of the atmosphere inside the case and inner volume.

BRIEF DESCRIPTION OF THE DRAWINGS

Referring to the drawings.

DETAILED DESCRIPTION

Figure 1:
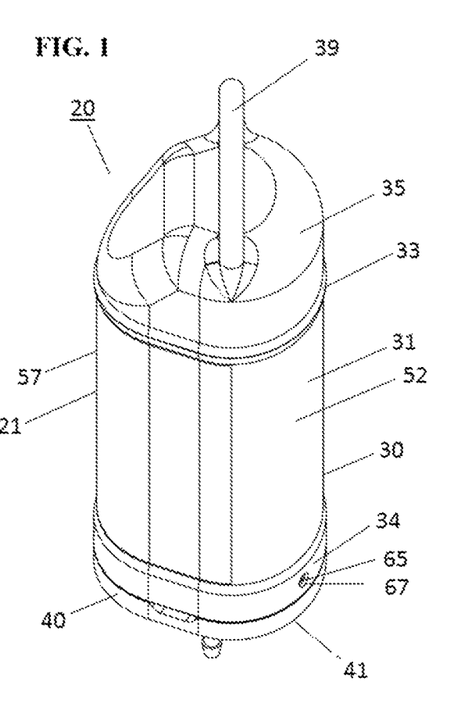
FIG. 1 is a top perspective view of a differential pressure monitoring apparatus constructed and arranged in accordance with the principle of the invention, the apparatus includes a case having a first end closed by a first end cap formed with a catch from which the apparatus can be supported in a chosen environment, and a second end closed by a second end cap connected sealably and removably to the case.
Figure 2:
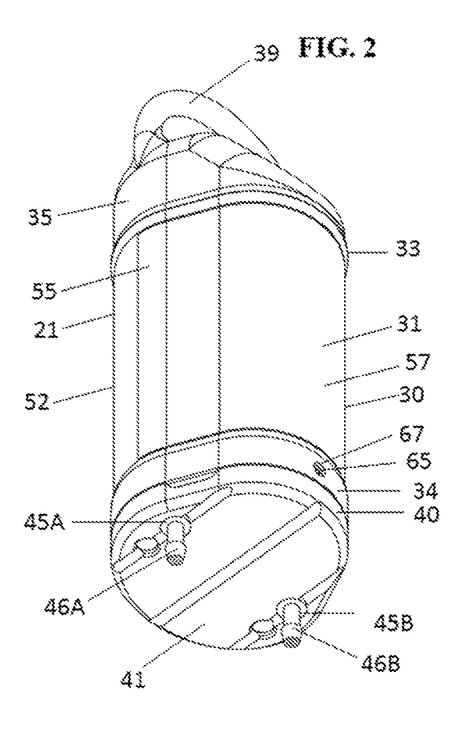
FIG. 2 is a bottom perspective view of the embodiment of FIG. 1.
Figure 3:
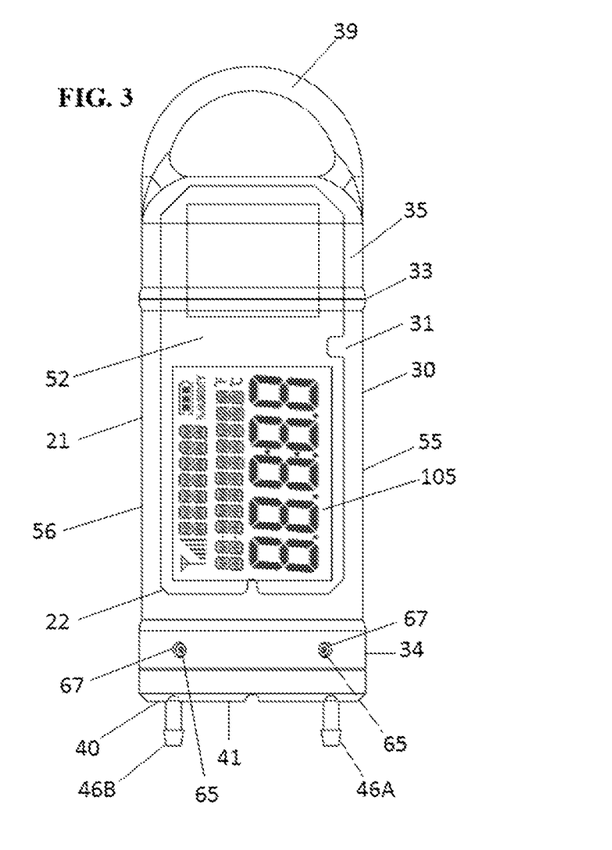
FIG. 3 is a front elevation view of the embodiment of FIG. 1.
Figure 4:
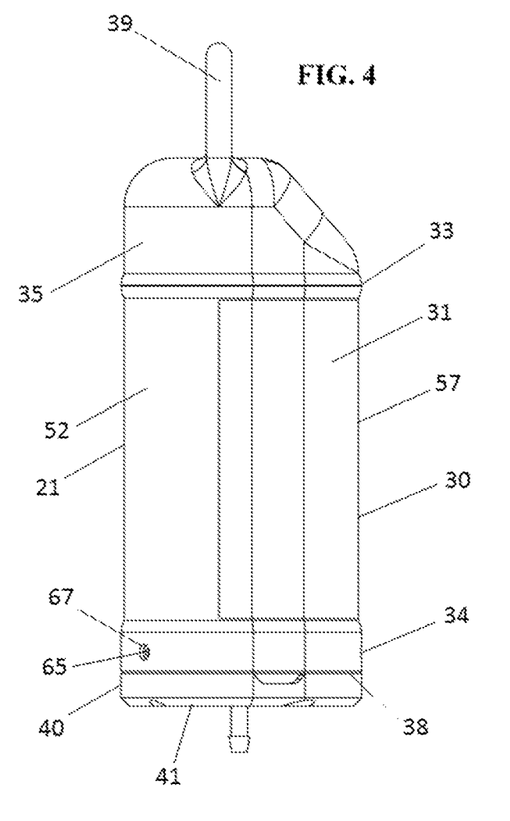
FIG. 4 is a right side elevation view of the embodiment of FIG. 1, the opposite left side elevation view being substantially the same thereof.
Figure 9:
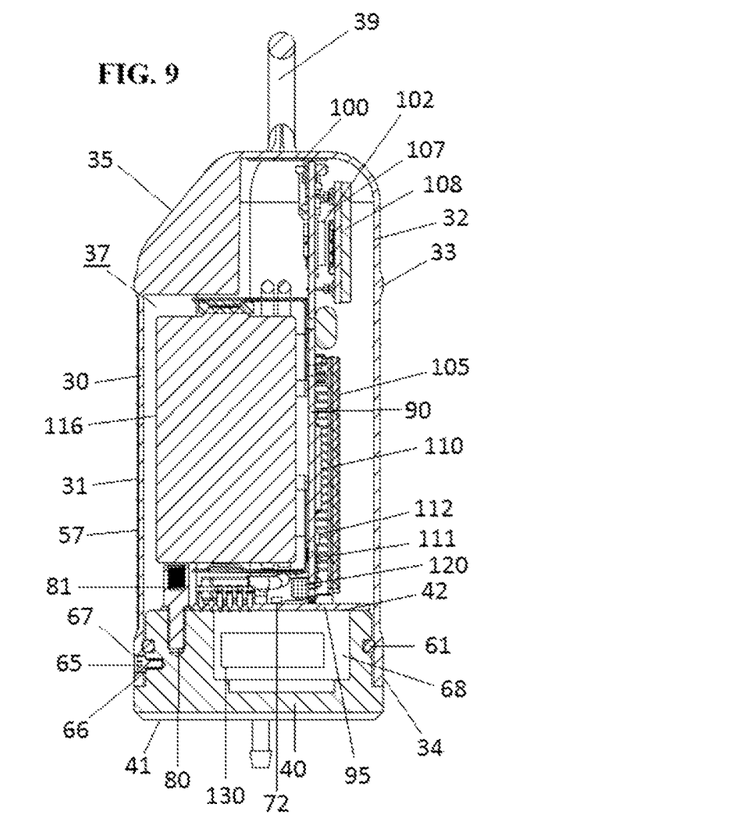
FIG. 9 is a section view taken along line 9-9 of FIG. 5.
Figure 10:
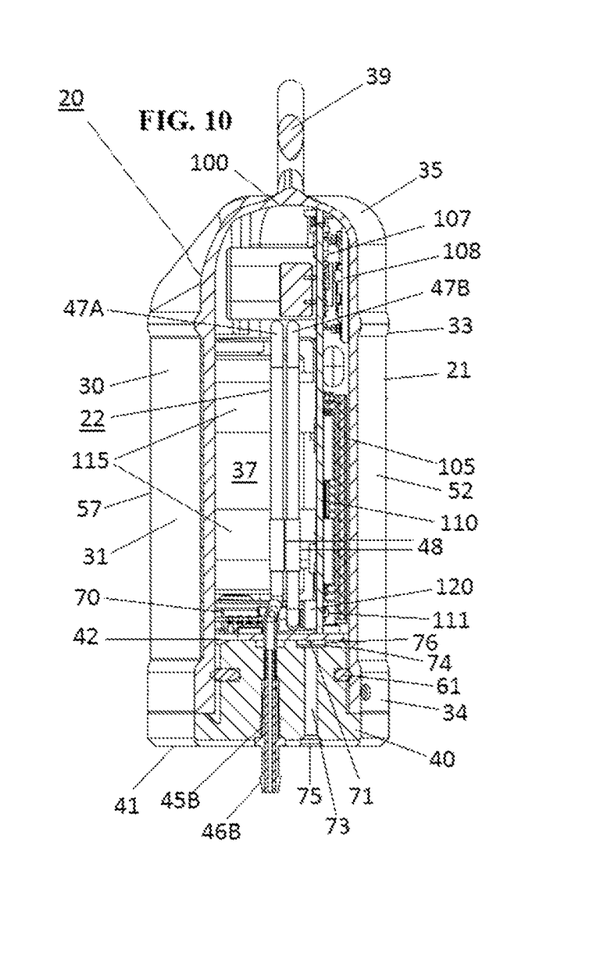
FIG. 10 is a section view taken along line 10-10 of FIG. 5.

Turning now to the drawings, in which like reference characters indicate corresponding elements throughout the several views, attention is directed to FIGS. 1-5, 9, and 10 illustrating a differential pressure monitoring apparatus 20 including case 21, and differential pressure monitoring unit 22 mounted in case 21 in FIGS. 3, 9, and 10. Case 21 includes continuous sidewall 30 having outer surface 31 and inner surface 32, and opposed ends 33 and 34. End 33 is a first or upper end of case 21. End 34 is a second or lower end of case 21. Upper end 33 is closed by end cap 35. End cap 35, an upper end cap of case 21, is integral with upper end 33, being inseparable from upper end 33 of continuous sidewall 30 of case 21. End cap 35 co-operates with inner surface 32 of continuous sidewall 30 to form volume 37 in FIGS. 9 and 10 within which unit 22 is positioned. Lower end 34 encircles opening 38 to volume 37. Volume 37 is for receiving unit 22 placed therein through opening 38. Continuous sidewall 30 and upper end cap 33 are integrally molded from a transparent plastic to enable the contents of volume 37 to be viewed therethrough for unit 22 inspection and for visually identifying therein moisture and other unwanted contaminants. End cap 35 is formed with a catch 39, a handle in the form of a half ring in this example, from which the apparatus can be supported/suspended in a chosen environment. Lower end 34 is closed by end cap 40. End cap 40, a lower end cap of case 21, is connected sealably and removably to continuous sidewall 30 for sealing and enclosing unit 22 in volume 37.

Continuous sidewall 30 is triangular, being a trilateral body, having three sides 50, 51, and 52, and three corners 55, 56, and 57, between upper end 33 and lower end 34. Preferably, sides 50, 51, and 52 and corners 55, 56, and 57 extend from upper end 33 to lower end 34. Sides 50 and 51 are straight and equal in length, side 52 is rounded (i.e. outwardly rounded), and each of the three corners is rounded (i.e. outwardly rounded), all of which defines the triangular shape of continuous sidewall 30, the trilateral body. Side 52 is a half ring or half pipe, in this example. The described shape of continuous sidewall 30, the trilateral body, is exceptionally strong, and extends to end cap 35.

Figure 5:
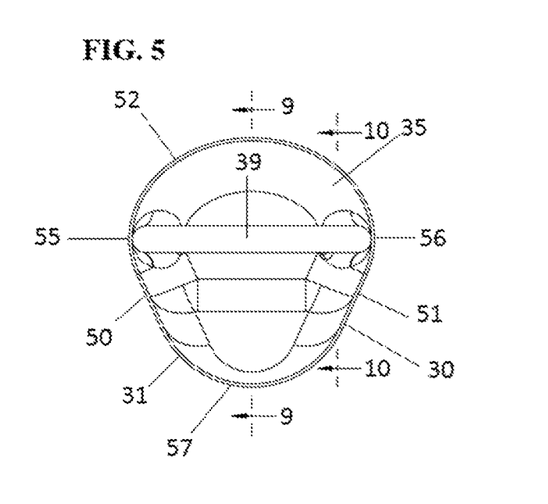
FIG. 5 is a top plan view of the embodiment of FIG. 1.
Figure 6:
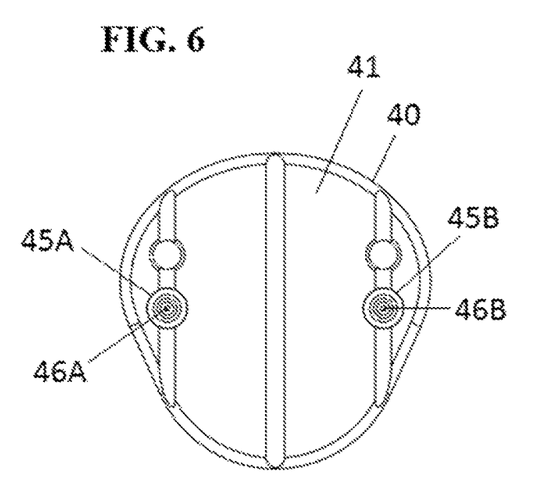
FIG. 6 is a bottom plan view of the embodiment of FIG. 1.
Figure 7:
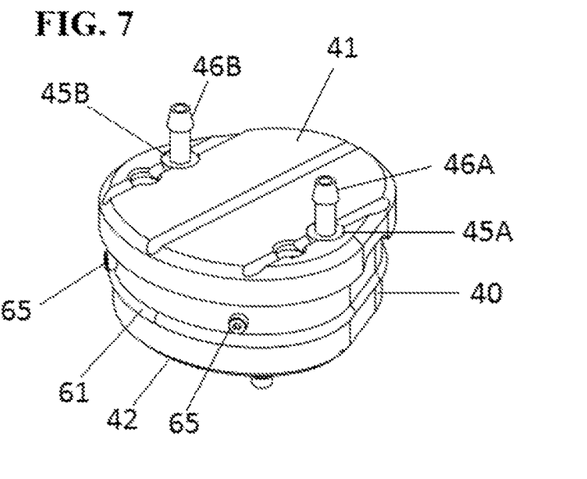
FIG. 7 is a bottom perspective view of the second end cap of the embodiment of FIG. 1.
Figure 8:
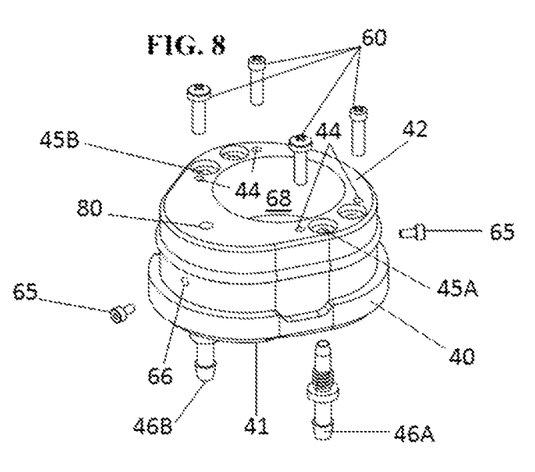
FIG. 8 is a top perspective view of the second end cap of the embodiment of FIG. 1.

References FIGS. 5, 7, and 8 in relevant part, end cap 40 is a unitary body, of plastic in this example, including outer end 41, inner end 42, threaded holes 44 outboard of humidity control chamber 68 adjacent to the outer perimeter of end cap 40, and passages 45A, 45B and 73 outboard of humidity control chamber 68 adjacent to the outer perimeter of end cap 40. Passages 45A, 45B and 73 extend through cap 40 from outer end 41 to inner end 42. The various passages are separate from one another, and do not interact with one another when apparatus 20 is assembled. Connection barbs 46A and 46B are inserted into passages 45A and 45B respectively. End cap 40 incorporates a battery standoff hole 80 on the inner cap end 42, towards corner 57. A battery standoff 81 is inserted into battery standoff hole 80.

Referring to FIGS. 9 and 10, end cap 40 is inserted inner end 42 first into opening 38 of lower end 34 and sealably encloses opening 38 to form inner volume 37, for sealably enclosing inner volume 37 that accommodates unit 22, thereby sealably enclosing unit 22 in inner volume 37. Threaded holes 44 accept screws 60 that secure end cap 40 via sensor board PCB 95 to unit 22. An O-ring 61, a gasket, provided in a groove in end cap 40 seals inner surface 32 of continuous sidewall 30, preventing gas and moisture ingress into inner volume 37. End cap 40 is secured in place with set screws 65 in FIGS. 1-4, which thread into corresponding threaded holes 66 (FIGS. 8 and 9) in the side of end cap 40 through corresponding through holes 67 (FIGS. 1-4 and 9) through continuous sidewall 30 near lower end 34, sealing unit 22 in inner volume 37.

Unit 22 sealed in inner volume 37 of case 21 includes a variety of sensors, including differential pressure sensor 70, humidity and temperature sensor 71 and external humidity and temperature sensor 72. Differential pressure sensor 70 is in sealed fluid communication with the external environment via, gas impermeable membrane tubes 47A and 47B. Gas impermeable membrane tubes 47A and 47B extend from the differential pressure sensor 70 to connection barbs 46A and 46B respectively. Gas impermeable membrane tubes 47A and 47B, a filter, used to reduce and/or prevent the ingress of moisture into differential pressure sensor 70. Two identical filters 48 to remove harsh and/or corrosive gas, are connected between differential pressure sensor 70 and gas impermeable membrane tubes 47A and 47B respectively. Temperature and humidity sensor 71 is in fluid contact with inner volume 37 and sealed from the external environment. External Temperature and humidity sensor is sealed into passage 73 by O-ring 76 and is in sealed fluid contact with the external environment via passage 73, non-gas permeable membrane 74 prevents unwanted material from entering volume 37. Filter 75 is inserted into passage 73 via lower end cap 40 outer end 41 prevents unwanted material from entering passage 73.

Unit 22 incorporates a printed circuit board ("PCB") assembly, including PCB 90 and sensor PCB 95, which carries, and electrically connects, the various components of unit 22. PCB 90 carries, and is electrically connected, to touch switch 100, externally operable reed switch 102 that acts as a secondary control, two additional externally operable reed switches, that act as additional controls, underneath an information display 105, a liquid crystal display ("LCD") in this example, that confronts, and that is visible through, side 52 of continuous sidewall 30, communication device 107 and universal communication socket 108, data processor 110, inertial sensor 111, and data storage device 112. Battery holder 115 connected to the back side of PCB 90 holds a battery 116, a dry cell battery pack in this example, that powers unit 22, the battery 116 is located above battery standoff 81 on the end cap 40 when apparatus 20 is assembled. When battery 116 is depleted, it may be removed from battery holder 115 and replaced with a fresh battery. Mounts 120 connect an end of sensor PCB 95 to an end of PCB 90. Sensor PCB 95 is horizontal, and PCB 90 extends vertically upright from one end of sensor PCB 95. Differential pressure sensor 70, and temperature and humidity sensor 71 are carried by, and electrically connected to, sensor PCB 95, which is electrically connected to PCB 90. PCB 90 and sensor PCB 95 operatively connect data processor 110 to differential pressure sensor 70, temperature and humidity sensor 71, inertial sensor 111, data storage device 112, and display 105, all of which work in concert with one another.

Touch switch 100 is externally operable for selectively connecting data processor 110 to data storage device 112 to allow transfer of data from data storage device 112 to data processor 110. Communication device 107 is operatively connected to at least one of data processor 110 and data storage device 112, and preferably both, for enabling data transfer between an external destination and at least one of data processor 110 and data storage device 112. Communication device 107 is a conventional wireless communication device for enabling wireless data transfer between the external destination and at least one of data processor 110 and data storage 112. Communication device 107 employs one or more wireless communication protocols, such as radio frequency, Wi-Fi, and/or one or more other chosen wireless communication protocols. Inertial sensor 111 is sealed in volume 37 from the ambient atmosphere. A humidity control pack 130, inner temperature and humidity sensor 71, in volume 37 of case 21, is for measuring, temperatures and moisture in volume 37 of case 21. Apparatus 20 can be repaired or serviced, when inner temperature and humidity sensor 71 measures a predetermined level, and data processor 110 sends a signal, indicating excessive moisture in volume 37. Service or repair can be performed simply by detaching lower end cap 40 from continuous sidewall 30 and withdrawing lower end cap 40 and unit 22 from volume 37 to enable the skilled worker to carry out necessary repairs and/or maintenance. In this example, humidity control pack 130 is carried by PCB 90, and is visible through side 52.

Unit 22 is assembled by connecting PCB 90 and sensor PCB 95, each equipped with the corresponding unit 22 components, with mounts 120 and connecting inner end 42 of end cap 40 to sensor PCB 95 via screws 60 and screw holes 44, advancing unit 22 into volume 37 through opening 38 and releasably connecting end cap 40 to continuous sidewall with set screws 65 for sealably and releasably/removably connecting end cap 40 to continuous sidewall 30, closing and sealing opening 38 and volume 37 sealably enclosing unit 22 in volume 37 of case 21, when volume 37 is sealed by end cap 40, of apparatus 20. Sensor PCB 95 in volume 37 is connected to inner end 42 of end cap 40, and PCB 90 extends upright from sensor PCB 95 to exteriorly operable touch switch 100 at the top of end cap 35 where touch switch 100 is operated exteriorly. Inner end 42 of cap is shaped to correspond to the triangular shape of opening 38 of lower end 34 of case 21. Unit 22 in volume 37 is sufficiently spaced apart from the inner surfaces of case 21 for preventing unwanted contact between unit 22 and the inner surfaces of case 21.

Apparatus 20 is portable, in that it is easily taken up by hand and carried about for installation in a selected environment. Apparatus 20 is installed in an environment in which pressure is to be monitored by securing apparatus 20 to selected location by suspending or supporting apparatus 20 in the chosen environment from catch 39. Apparatus 20 is switched on exteriorly, and operated exteriorly by, touch switch 100 and operates according to instructions preprogrammed into data processor 110 and operates with the ambient environment without the use of external controls. Touch switch 100 is conventional, is enclosed in volume 37 adjacent to end cap 35 opposite to catch 39 and is operated exteriorly by touching the outer surface of end cap 35 opposite to touch switch 100, requiring no physical contact with touch switch 100. The other switches of unit 22 are similarly exteriorly operable. Differential pressure sensor 70, temperature and humidity sensor 71, are in contact with their respective environments and concurrently detect and monitor, in real time, differential pressure, temperature and humidity uptake, respectively, of their relative environments. Real time monitoring of humidity level via temperature and humidity sensor 71, prevents differential pressure sensor 70 accuracy and functionality loss when data processor 100 calculates humidity uptake of unit 22. Inertial sensor 111, in turn, and concurrently with the other sensors, senses, in real time, accelerations and movements that can occur if apparatus 20 is moved. Data processor 110 operatively coupled to the various sensors records and stores the data from the various sensors in data storage device 112 and displays the data on display 105 viewable through side 52. Display 105 is large, enabling it to display all of the sensor data and calculations made by data processor 110. Communication device 107 operatively connected to at least one of data processor 110 and data storage device 112, and preferably both, enables transfer of the data between an external destination and at least one of data processor 110 and data storage device 112. Communication device 107 is a conventional wireless communication device in a preferred embodiment for enabling wireless data transfer between the external destination and at least one of data processor 110 and data storage 112. Unit 22 can incorporate an alarm, such as a visual alarm, operatively connected to data processor 110 and set to issue an alarm when a level of pressure measured by differential pressure sensor 70 reaches one or more predetermined levels, when unit 22 is set to predetermined settings. In a particular embodiment, data processor 110 transmits a signal wirelessly to an external destination when a level of pressure reaches a predetermined level to alert a skilled worker that the level of pressure of the environment measured by unit 22 has reached a predetermined level.

As described above, differential pressure sensor 70, and internal humidity sensor 71 in contact with the ambient environment concurrently detect and monitor, in real time, differential pressure of external environment, and inner volume 37 temperature and humidity, respectively. During operation of unit 22, data processor 110 calculates the moisture, i.e. humidity, uptake level and moisture uptake rate of the inner volume 37 and displays the calculated moisture uptake level and rate on display 105 in response enabling the skilled worker to extrapolate how long to deploy apparatus 20 at the chosen environment, when temperature and humidity sensor 71 is sensing moisture, i.e., humidity/moisture uptake level and humidity/moisture uptake rate, of the atmosphere inside case 21. Furthermore, the calculated uptake level of unit 22 enables the skilled worker to extrapolate the length of time needed before service of the apparatus 20 in a chosen controlled environment; and time before apparatus 20 can be re-deployed. Unit 22 can incorporate an alarm, such as a visual alarm, operatively connected to data processor 110 and set to issue an alarm when the moisture uptake level measured by inner temperature and humidity sensor 71 reaches a predetermined level, and/or when the moisture uptake rate measured by inner temperature and humidity sensor 71 reaches a predetermined rate, to enable the skilled worker to remove apparatus 20 from the chosen environment for service. In a particular embodiment, data processor 110 transmits a signal wirelessly to an external destination when the moisture uptake level measured by inner temperature and humidity sensor 71 reaches a predetermined level, and/or when the moisture uptake rate measured by temperature and humidity sensor 71 reaches a predetermined rate, to enable the skilled worker to remove apparatus 20 from the chosen environment for service.

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A differential pressure monitoring apparatus, comprising:
   a case, the case includes a continuous sidewall having opposed first and second ends, the first end is closed by a first end cap, the second end is closed by a second end cap, the second end cap is connected sealably and removably, to the continuous sidewall;
   a differential pressure monitoring unit mounted in the case, the differential pressure monitoring unit includes:

a differential pressure sensor in sealed fluid communication with the ambient environment external to the case;

a temperature and humidity sensor in sealed fluid communication with the inner atmosphere of the case;

a temperature and humidity sensor in sealed fluid communication with the external atmosphere of the case;

a non-gas permeable membrane tube, whereby moisture is filtered out;

a filter, where by unwanted corrosive gases are removed prior to exposure to sensors;

a data processor operatively connected to the pressure sensor, and the inner humidity sensor;

data storage and an information display operatively connected to the data processor;

an externally operable switch for selectively connecting the data processor to the data storage to allow transfer of data from the data storage to the data processor;

a communication device operatively connected to at least one of the data processor and the data storage for enabling data transfer between an external destination and at least one of the data processor and the data storage; and a power supply mounted in the case, the power supply being operatively connected to power the differential pressure monitoring unit.

2. The differential pressure monitoring apparatus according to claim 1, wherein differential pressure sensors are mounted to the second end cap and are in sealed fluid communication via a first passage of the second end cap, and a second passage of the second end cap.

3. The differential pressure monitoring apparatus according to claim 1, wherein the non-gas permeable membrane tube is in sealed fluid communication with the differential pressure sensor and the external environment.

4. The differential pressure monitoring apparatus according to claim 1, wherein the filter is in sealed fluid communication with the differential pressure sensor and the external environment.

5. The differential pressure monitoring apparatus according to claim 1, wherein the temperature and humidity sensor is mounted to the second end cap and is in sealed fluid communication with the inner volume.

6. The differential pressure monitoring apparatus according to claim 1, wherein the external temperature and humidity sensor is mounted to the second end cap and is in sealed fluid communication with the external atmosphere.

7. The differential pressure monitoring apparatus according to claim 1, further comprising a catch formed in the first end of the case from which the apparatus can be suspended.

8. The differential pressure monitoring apparatus according to claim 1, wherein the communication device is a wireless communication device for enabling wireless data transfer between the external destination and at least one of the data processor and the data storage.

9. The differential pressure monitoring apparatus according to claim 1, wherein the differential pressure monitoring unit further includes an inertial sensor sealed from the ambient atmosphere, and the data processor is operatively connected to the inertial sensor.

10. The differential pressure monitoring apparatus according to claim 1, wherein the first end cap is integral with, being inseparable from, the first end of the continuous sidewall.

11. The differential pressure monitoring apparatus according to claim 1, wherein the data processor is for calculating at least one of moisture uptake level and moisture uptake rate of the inner volume, when the either the temperature and humidity sensor or external temperature and humidity sensors, are sensing moisture of the atmosphere inside and/or outside the case.

12. The differential pressure monitoring apparatus according to claim 1, wherein the continuous sidewall is triangular, having three sides and three corners, between the first end and the second end, two of the three sides being straight and equal in length, one of the three sides being rounded, and each of the three corners being rounded.

13. The differential pressure monitoring apparatus according to claim 12, wherein the information display confronts the rounded one of the three sides of the continuous sidewall, and the rounded one of the three sides of the continuous sidewall is transparent to enable the viewing of the information display therethrough.

* * * * *